United States Patent [19]

Hammond et al.

[11] Patent Number: 5,895,489
[45] Date of Patent: Apr. 20, 1999

[54] MEMORY MANAGEMENT SYSTEM INCLUDING AN INCLUSION BIT FOR MAINTAINING CACHE COHERENCY

[75] Inventors: Gary N. Hammond, Campbell, Calif.; Pradeep Dubey, White Plains, N.Y.; Mustafiz R. Choudhury, Sunnyvale, Calif.

[73] Assignee: Intel Corporation, Santa Clara, Calif.

[21] Appl. No.: 07/777,608

[22] Filed: Oct. 16, 1991

[51] Int. Cl.$^6$ .................................................. G06F 12/12
[52] U.S. Cl. ........................... 711/144; 711/141; 711/145
[58] Field of Search ................................. 364/200, 900; 395/400, 425; 380/4; 711/141, 144, 145

[56] References Cited

U.S. PATENT DOCUMENTS

| | | | |
|---|---|---|---|
| 4,669,043 | 5/1987 | Kaplinsky | 711/3 |
| 4,672,538 | 6/1987 | Takane | 711/2 |
| 4,860,195 | 8/1989 | Krauskopf | 711/202 |
| 4,864,493 | 9/1989 | Kishi | 711/221 |
| 4,881,170 | 11/1989 | Morisada | 395/383 |
| 4,959,860 | 9/1990 | Watters et al. | 380/4 |
| 4,972,338 | 11/1990 | Crawford et al. | 711/206 |
| 5,050,070 | 9/1991 | Chastain et al. | 395/379 |
| 5,053,944 | 10/1991 | Krauskopf | 711/202 |
| 5,144,551 | 9/1992 | Cepulis | 711/163 |
| 5,159,686 | 10/1992 | Chastain et al. | 395/675 |
| 5,165,027 | 11/1992 | Krauskopf | 711/206 |

OTHER PUBLICATIONS

Patricia J. Teller, "Translation-Lookaside Buffer Consistency", Computer, Jun. 1990, pp.26–36.
Priscilla M. Lu, et al., "Architecture of A VLSI Map for BELLMAC*-32 Microprocessor", Compcon 83 Spring, Digest of Papers, Feb. 28, 1983, pp. 213–217.

Primary Examiner—Tod R. Swann
Assistant Examiner—J. Peikari
Attorney, Agent, or Firm—Blakely, Sokoloff, Taylor & Zafman LLP

[57] ABSTRACT

A memory management system for a computer, where cache coherency between a descriptor cache and data cache is preserved through an inclusion bit mechanism. In one embodiment, an inclusion bit is set for a descriptor cached in a data cache corresponding to a descriptor cached in a descriptor cache such that the association between the descriptors is indicated. Whenever a descriptor in the data cache with a set inclusion bit is altered, the entire descriptor cache is flushed by virtue of the set inclusion bit. Furthermore, in the same embodiment, a valid bit is set for a descriptor in the data cache which is cached from the descriptor table. Whenever a descriptor in the descriptor table, which has a valid bit set in the data cache, is modified, the valid bit is reset. And if the same descriptor with its valid bit reset has a set inclusion bit, then the entire descriptor cache is flushed. As a result, the cache coherency among descriptor cache, data cache and descriptor table is preserved in this improved memory management system.

6 Claims, 10 Drawing Sheets

AVL  Available for Use
     by System Software
Base Segment Base Address
DPL  Descriptor Privilege Level
S    Descriptor Type
     (0 = System; 1 = Application)
G    Granularity of Limit = 1Byte/4 KBytes
Limit Segment Limit
P    Segment Present
Type Segment Type
D    Default Operation Size
     (0 = 16-Bit Segment; 1 = 32-Bit Segment)

Processor's Descriptor Cache
920

Tested, Unscrambled          Level 3

Processor's Data Cache
910

Untested, Scrambled          Level 2

Main Memory
900

Untested, Scrambled          Level 1

Descriptor Table

| Entry 0 | | Entry 1 | | | Replace Entry |
|---------|-----------|-------|-----------|---------|---------------|
| Valid | Inclusion | Valid | Inclusion | LRU Bit | |
| 0 | X | X | X | X | 0 |
| 1 | X | 0 | X | X | 1 |
| 1 | 0 | 1 | 0 | 0 | 0 |
| 1 | 1 | 1 | 0 | 1 | 1 |
| 1 | 0 | 1 | 1 | X | 1 |
| 1 | 1 | 1 | 1 | X | 0 |
| 1 | 1 | 1 | 1 | 0 | 0 |
| 1 | 1 | 1 | 1 | 1 | 1 |

Inclusion Bit Bias

FIG. 10

MEMORY MANAGEMENT SYSTEM INCLUDING AN INCLUSION BIT FOR MAINTAINING CACHE COHERENCY

RELATED APPLICATION

The present application is related to a application, entitled A SEGMENT DESCRIPTOR CACHE FOR A MICROPROCESSOR, filed on the same date as the current application, now U.S. Pat. No. 5,838,469.

BACKGROUND OF THE INVENTION

1. Field of the Invention

The present invention relates to memory management systems for computers and more specifically, to memory segmentation systems for microprocessors with increased cache memory coherency.

2. Art Background

Memory management is a hardware mechanism which lets operating systems create simplified environments for running programs such that when several programs are running at the same time, they may each be given an independent address space to avoid interference with each other. Memory management typically consists of segmentation and paging. Segmentation is used to give each program several independent, protected address spaces ("segments"). Paging is used to support an environment where large address spaces are simulated using a small amount of random access memory ("RAM") and some disk storage. System designers may choose to use either or both of these mechanisms. When several programs are running at the same time, either mechanism can be used to protect programs against interference from other programs.

Segmentation allows memory to be completely unstructured and simple, like the memory model of a simple 8-bit processor, or highly structured with address translation and protection. Each segment is an independent, protected address space. Access to segments is controlled by data which describes its size, the privilege level required to access it, the kinds of memory references which can be made to it (instruction fetch, stack push or pop, read operation, write operation, etc.), and whether it is present in memory.

Reference is now made to FIG. 1A, where a pictorial representation of memory address translation mechanism is shown. Segmentation mechanism 105 translates segmented (logical) address 100 into an address for a continuous, unsegmented address space, called linear address 110. If paging is enabled, paging mechanism 115 translates linear address 110 into physical address 120. If paging 115 is not enabled, linear address 110 is used as physical address 120. Physical address 120 ultimately appears on the address bus coming out of the processor.

An example of a memory management system can be found implemented in the i486™ microprocessors manufactured by Intel Corporation of Santa Clara, Calif., the Assignee of the present application. In the i486™ microprocessors, a logical address consists of the 16-bit segment selector for its segment and a 32-bit offset into the segment. With reference to FIG. 1A, logical address 100 is translated into linear address 110 by adding offset 101 to base address 103 of the segment. Base address 103 is derived from segment descriptor 104, which is a data structure in memory which provides the size and location of a segment, as well as access control information. For example, the segment descriptor in a i486™ microprocessor comes from one of two tables, the global descriptor table (GDT) or the local descriptor table (LDT). There is one GDT for all programs in the system, and one LDT for each separate program or task being run. If the operating system allows, different programs can share the same LDT. The system also may be set up with no LDTs; all programs will then use the GDT. For more information with regard to the i486™ microprocessors, please refer to i486™ Microprocessor: Programmer's Reference Manual, available from Intel Corporation, Santa Clara, Calif.

The translated address is linear address 110. If paging mechanism is not used, linear address 110 is physical address 120. If paging is used, a second level of address translation is needed to produce physical address 120.

Reference is still made to FIG. 1A. Segment selector 102 is shown pointing to segment descriptor 104 which defines a segment. A program in the i486™ microprocessors may call for more segments than those segment selectors currently occupying segment registers. When this is true, the program uses forms of MOVE instructions to change the contents of the segment registers when it needs to access a new segment. As shown in FIG. 1B, segment selector 132 identifies a segment descriptor by specifying descriptor tables 133 and descriptor index 134 within that table.

Reference is now made to FIG. 2, where a descriptor format in the i486™ microprocessor is illustrated. However, because the descriptor format needs to provide backward compatibility for prior processor architectures, the descriptor format becomes scrambled when it is stored in memory. To simplify internal processor operations, a raw scrambled descriptor needs to be transformed into a unscrambled descriptor. The transformation of a scrambled segment descriptor 300 into an unscrambled segment descriptor 310 for the i486™ processors is illustrated in FIG. 3.

Further, a segment descriptor cache as described in the above identified co-pending application can be used to retain previously fetched, unscrambled, and protection tested descriptors such that on subsequent segment register loads, the descriptor can be sourced from the segment descriptor cache and loaded directly into the segment descriptor register file in one clock cycle, thus bypassing all of the work and overhead usually associated with segment register loads. FIG. 9 shows the three level hierarchy of main memory 900, processor's data cache 910 and processor's descriptor cache 920 which exist when a descriptor cache 920 is introduced into a microprocessor. It should be apparent to those skilled in the art that mechanisms must be employed at each level to ensure the descriptor data maintained at one level is consistent with the descriptor data in the previous level.

As will be described, the present invention discloses an improved memory management system for a computer, where cache coherency between a descriptor cache and a data cache is preserved through an inclusion bit mechanism. In one embodiment, an inclusion bit coupled to a data cache is set for a descriptor contained in a data cache line indicating the same unscrambled descriptor is also cached in the descriptor cache. Thus the inclusion bit indicates an association between the data cache line and the descriptor cache. Whenever data in the data cache with an inclusion bit set is altered, modified, or swapped out, the entire descriptor cache is flushed to reflect the fact that the descriptor contained in the descriptor cache is no longer valid or the association is no longer valid. As such, the inclusion bit maintains cache coherency between the descriptor cache and data cache. In turn existing hardware caching mechanisms maintain cache coherency between the data cache and the descriptor table in main memory.

SUMMARY OF THE INVENTION

Therefore, it is an object of the present invention to provide an improved memory management system with increased memory coherency.

It is another object of the present invention to provide an improved memory management system with increased cache coherency but without degradation in segment descriptor performance.

The present invention discloses an improved memory management system for a computer, where cache coherency between a descriptor cache and a data cache is preserved through an inclusion bit mechanism. In one embodiment, an inclusion bit is set for a descriptor in the data cache corresponding to another descriptor cached in the descriptor cache such that the association between the descriptors is indicated. Whenever a descriptor in the data cache with a set inclusion bit set is altered or swapped out, the entire descriptor cache is flushed due to the fact that the association between the two descriptors is no longer valid. As such, cache coherency among the descriptor cache, the data cache and the descriptor table is preserved in this improved memory management system.

BRIEF DESCRIPTION OF THE DRAWINGS

FIG. 10 illustrates a replacement algorithm currently implemented in the present invention.

DETAILED DESCRIPTION OF THE INVENTION

An improved memory management system for memory operations in microprocessors is disclosed having particular application for use by microprocessor memory segmentation systems to achieve cache coherency between a descriptor cache and a data cache. In the following description for purposes of explanation, specific memories, organizations, architectures, data rates, etc. are set forth in order to provide a thorough understanding of the present invention. However, it will be apparent to one skilled in the art that the present invention may be practiced without these specific details. In other instances, well known circuits are shown in block diagram form in order not to obscure the present invention unnecessarily.

Figure 4:
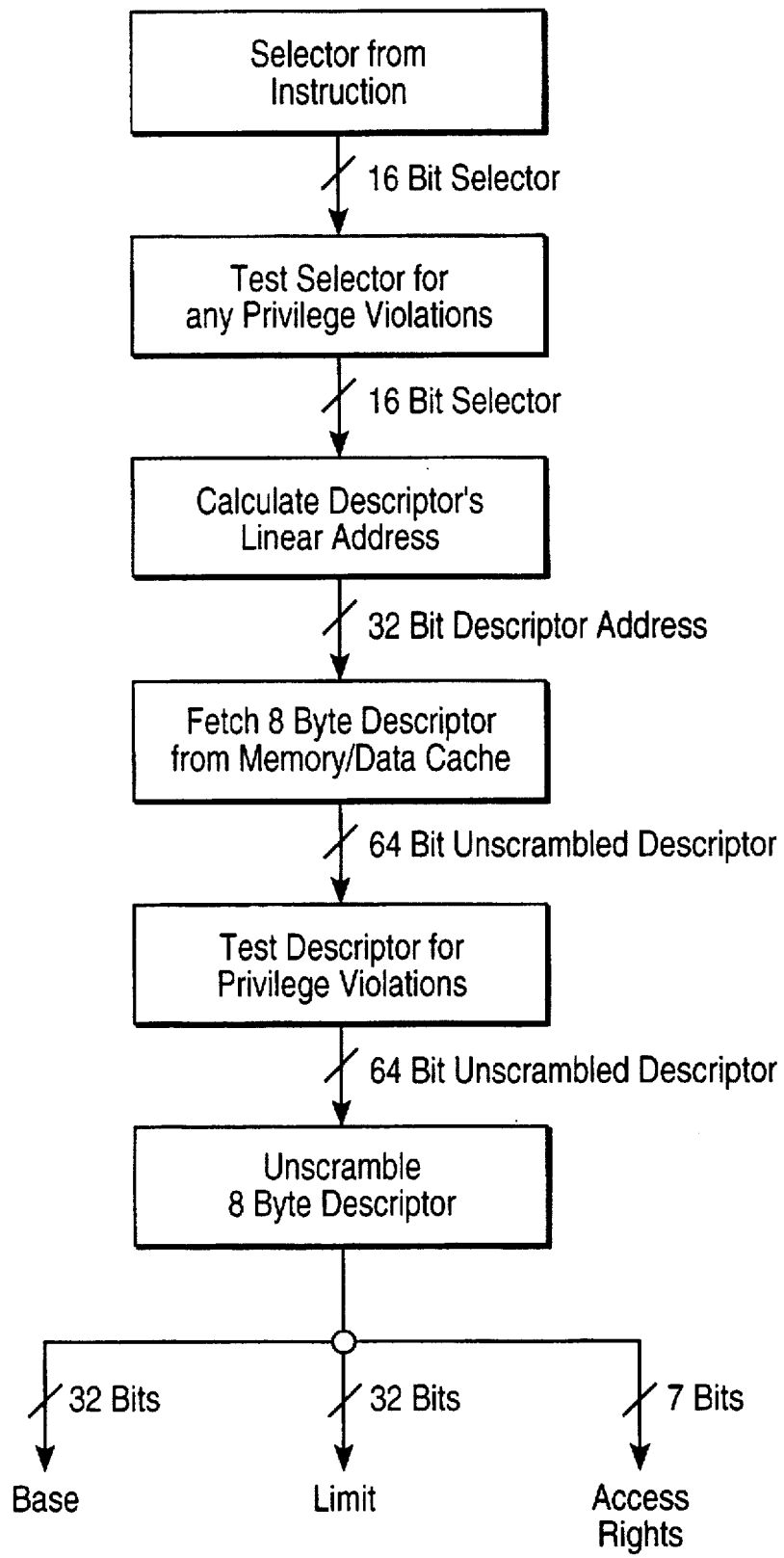
FIG. 4 is a block diagram representation of the process of loading a protected mode segment register.

Reference is now made to FIG. 4, where the process of loading a segment register is described in a flow chart. It should be appreciated by those skilled in the art that the segment register load is basic to any segmentation memory management scheme. As shown, when the processor encounters a selector from an instruction such as MOVE SEG REG, the processor first tests the selector for any privilege violations such that a less privileged program cannot use a more privileged program to access protected data. If no privilege violation is found, then an 8 byte descriptor is fetched by the processor from memory/data cache based on the selector's identifying a descriptor table and a descriptor within that table. This descriptor is tested for privilege violations. If no privilege violation is found, then the descriptor is unscrambled and the information regarding the segment such as the size and location of the segment, as well as control and status information, can be loaded into the segment register for the program to execute.

Figure 1A:
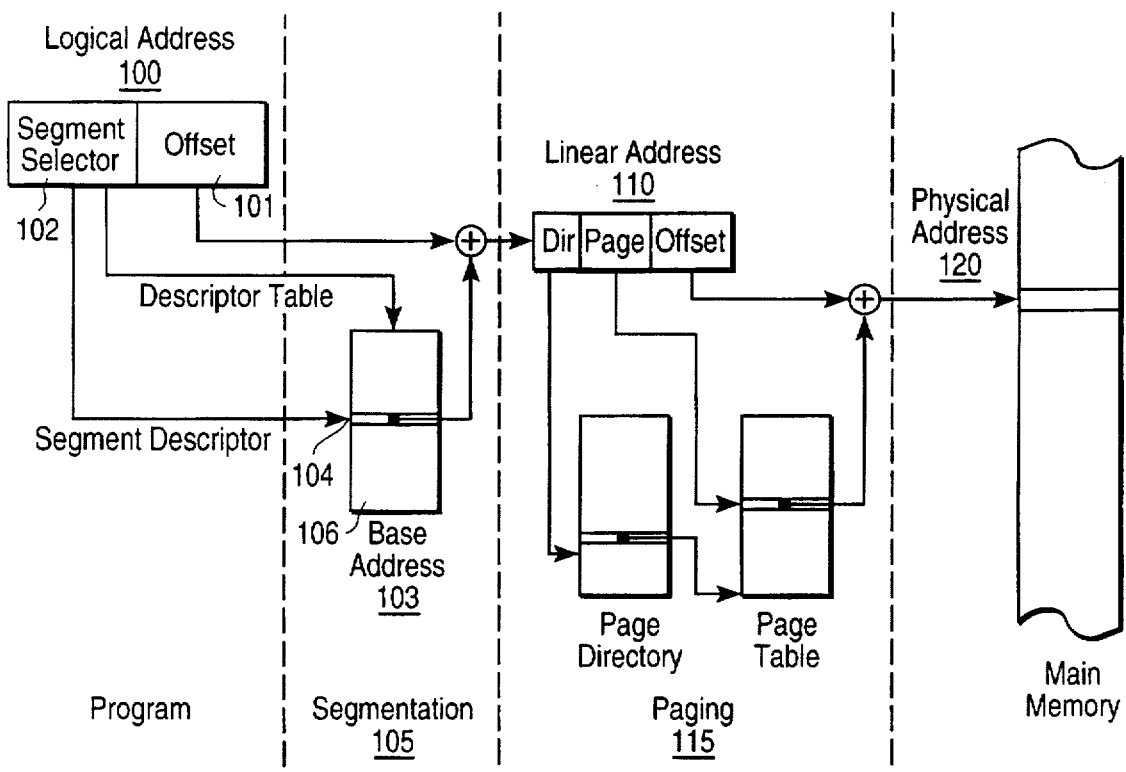
FIG. 1A is a pictorial representation of a memory address translation mechanism.
Figure 1B:
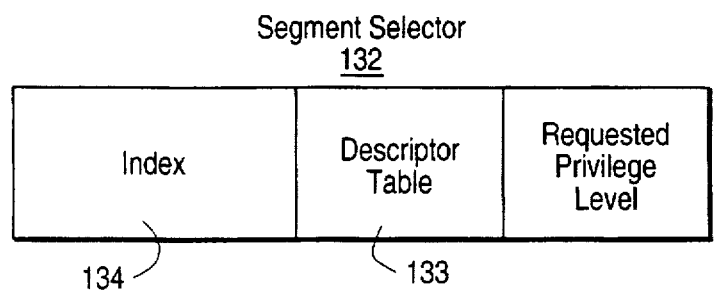
FIG. 1B illustrates the format of a segment selector.
Figure 2:
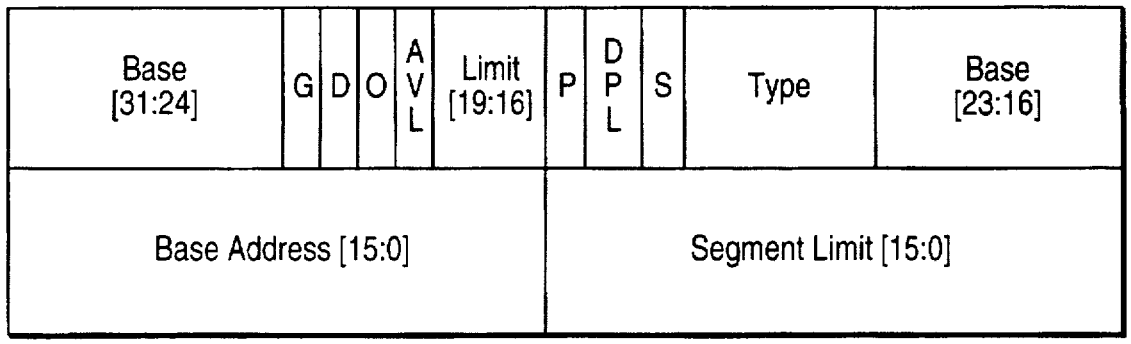
FIG. 2 illustrates the format of a segment descriptor.
Figure 3:
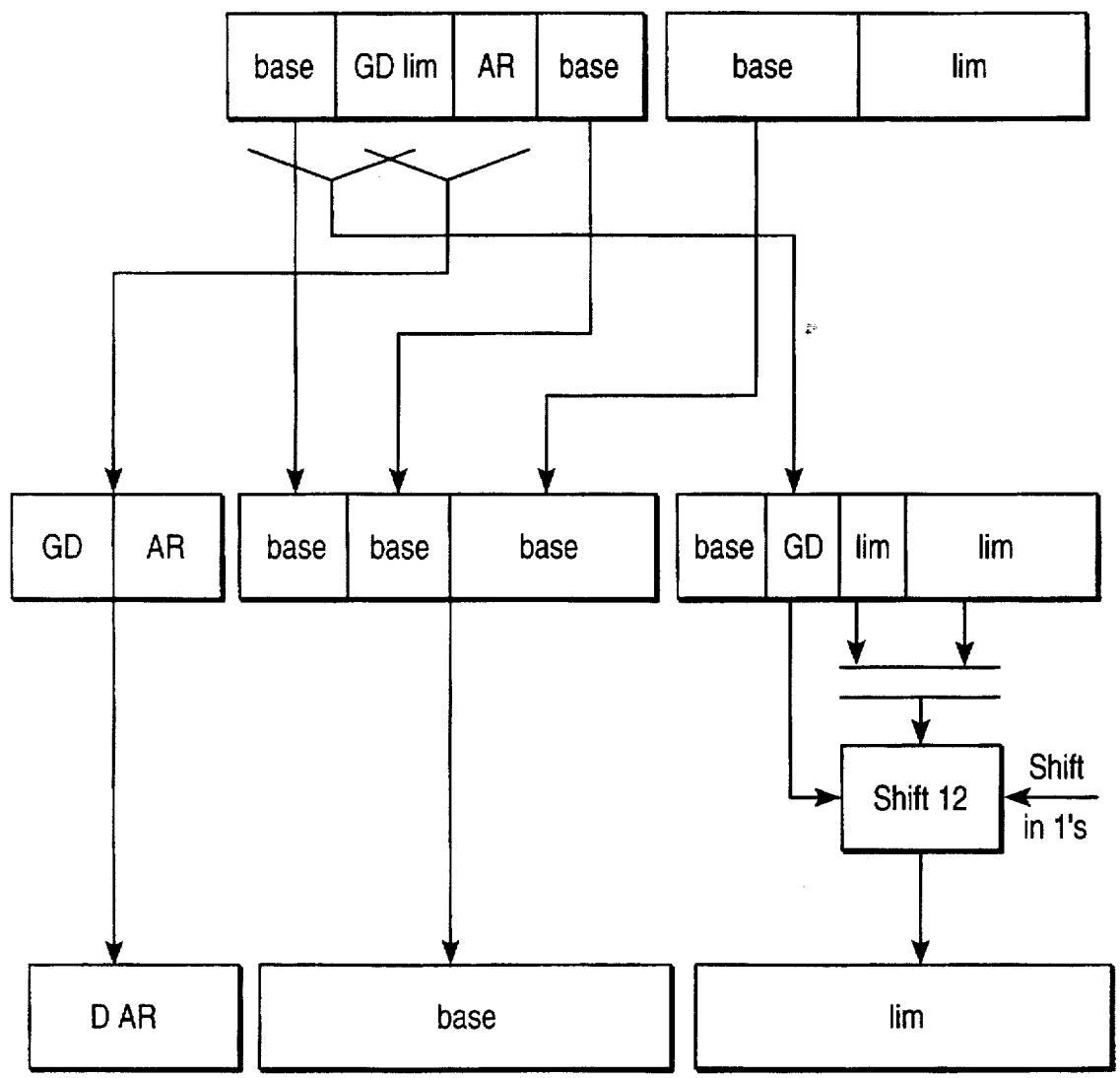
FIG. 3 illustrates the process of unscrambling a scrambled segment descriptor.
Figure 5:
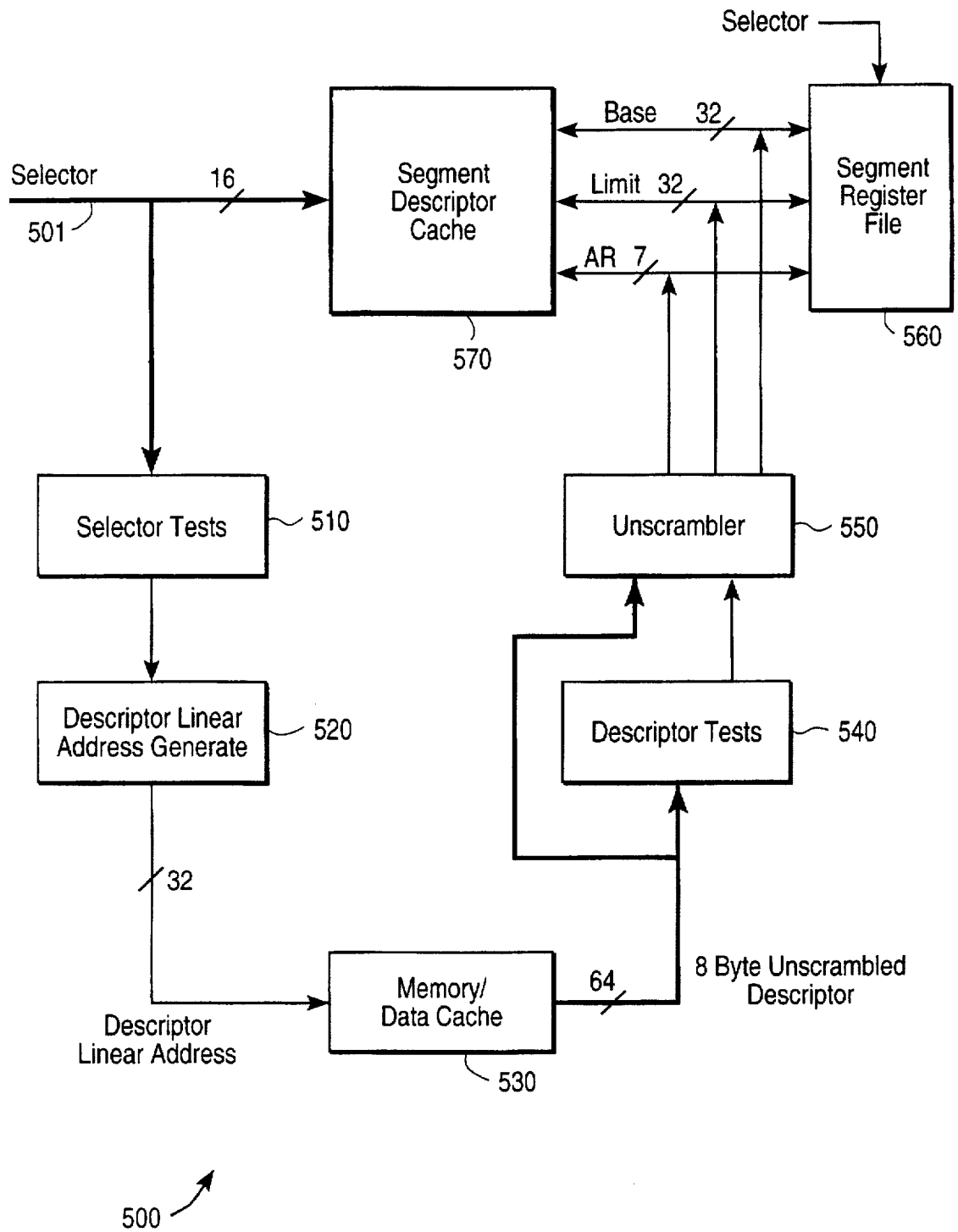
FIG. 5 is a block diagram representation of a memory segmentation system.

Reference is now made to FIG. 5, where a system implementing a segment register load incorporating a descriptor cache is shown. It should be understood by those skilled in the art that the dimensions of the buses are for illustrative purposes only and that the present invention can be practiced without the specific detail of the illustration. As shown in FIG. 5, system 500 comprises selector privilege tester 510 for testing any privilege violations in selector 501 such that a less privileged program cannot gain access to protected data. As used in the current microprocessor, when the privilege field of the segment selector contains a privilege level having a greater value (i.e. less privileged) than the program, the selector overrides the program's privilege level. If selector 501 passes privilege testor 510, it is transferred to descriptor address generator 520. Descriptor address generator 520 then generates the proper address of the descriptor in the descriptor table for the selector. Currently, two descriptor tables are used: global and local descriptor tables. The address generation process involves changing the current segment to specify a table based on selector 501, and setting the Effective Address to the selector's index value. With the Effective Address, a descriptor can be fetched from memory 530 and latched into unscrambler 550 and descriptor tester 540. Descriptor tester 540 checks the descriptor to control access to the segment. If an access violation occurs, a fault is generated to the processor. Unscrambler 550 transforms the descriptor into an internal unscrambled form as shown in FIG. 3. A successful descriptor is loaded into segment register file 560 and stored into descriptor cache 570 for future use.

Figure 6:
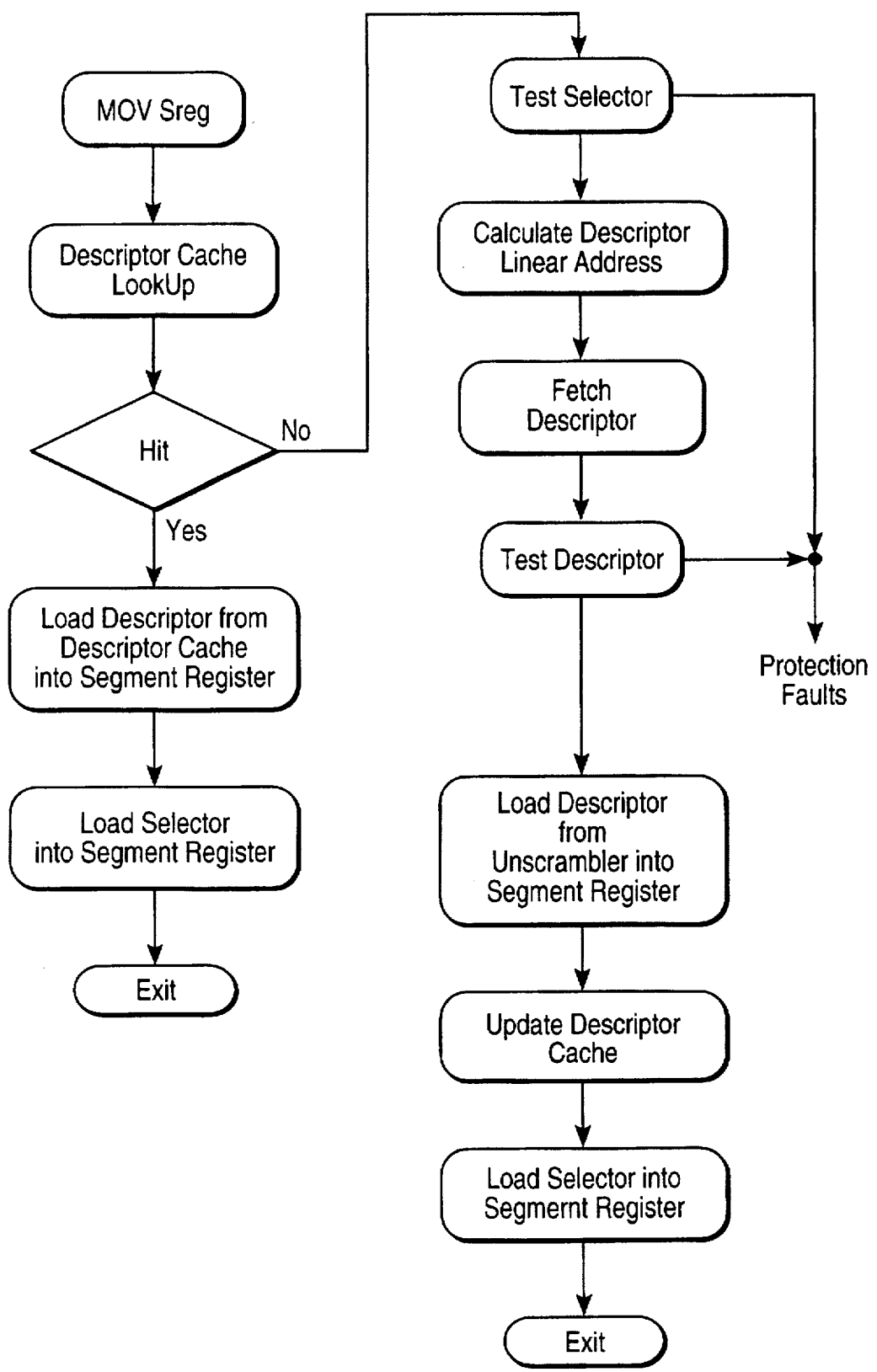
FIG. 6 is a flow chart illustrating the operation of a segment descriptor load.

Reference is also made to FIG. 6, where a flow chart identifying the sequence of operation of a segment descriptor load is shown. When selector 501 is encountered as in a MOV Sreg instruction, descriptor cache 570 is looked up. If a corresponding descriptor is found ("a hit"), then the descriptor is loaded from descriptor cache 570 into segment register file 560, along with selector 501. If no corresponding descriptor is found ("a miss"), then selector 501 is tested for privilege violations such that a fault may be generated for a selector with insufficient privilege level. If selector 501 passes the privilege tester 510, then a descriptor linear address can be calculated 520 and a descriptor can be fetched from memory 530. The descriptor is tested for its privilege level and a fault is generated for any privilege violations. The descriptor is unscrambled and the unscrambled descriptor is loaded into segment register file 560. The unscrambled descriptor is also used to update descriptor cache 570.

Figure 7:
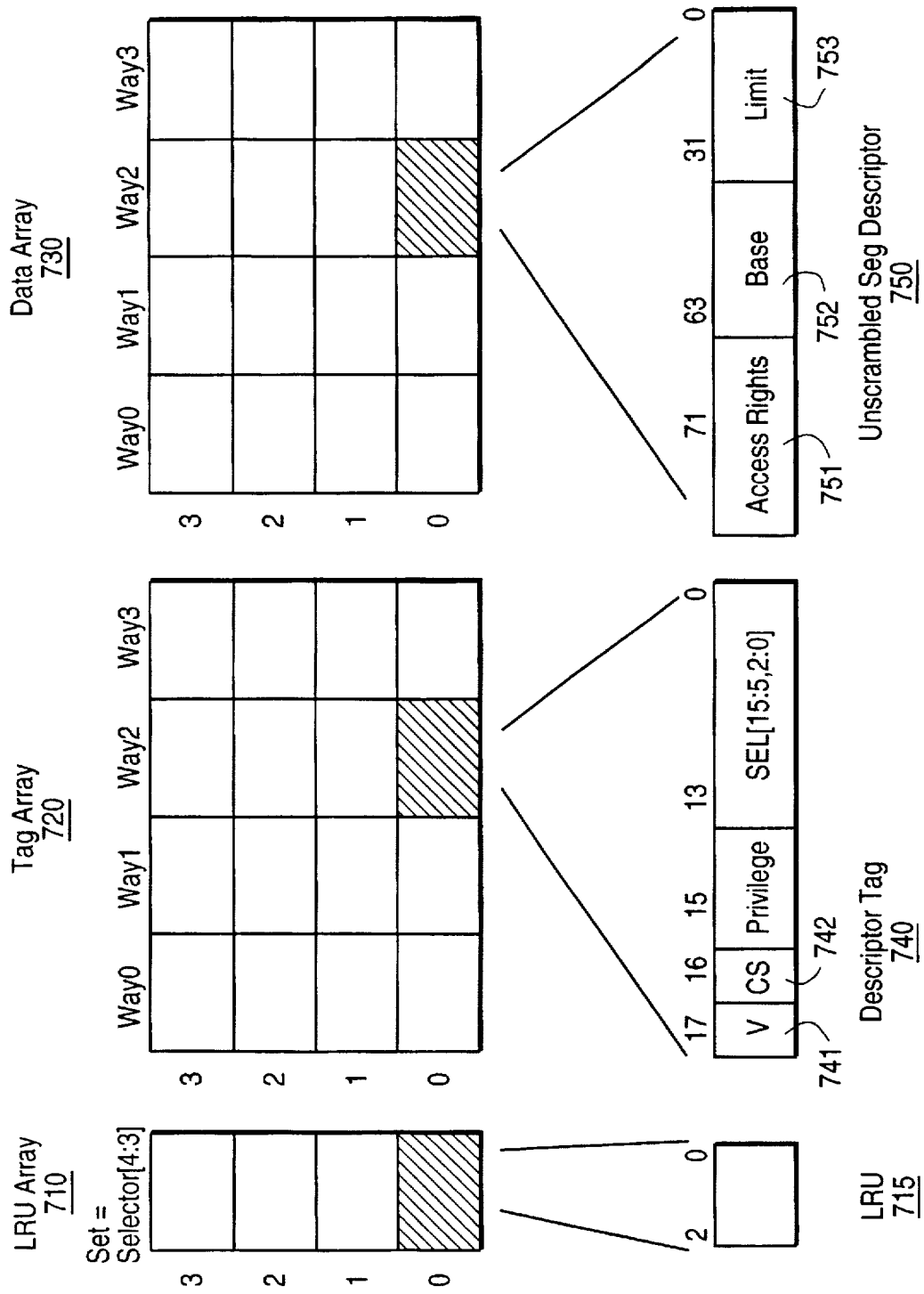
FIG. 7 illustrates a currently implemented descriptor cache.

Reference is now made to FIG. 7, where the diagram of a segment descriptor cache is shown. Although a 4-by-16 set associative cache is illustrated, it should be understood by those skilled in the art that other organizations can be easily implemented to achieve the desired functionality. Descriptor cache 770 is divided into three arrays: tag array 720, data array 730, and Least Recently Used ("LRU") array 710. The selector bits [4:3] are used as the set number and index into the descriptor cache. Each set is composed of 4 "ways", each of which is associatively searched for the desired entry.

The LRU entry 715 is composed of 3 bits used to determine which "way" in the set is least recently used. When a new entry is to be placed in the descriptor cache, the LRU entry for the set determines which entry can be replaced with a minimum of performance impact.

Descriptor tag 740 from tag array 720 comprises the remaining selector bits and privilege level of the processor when the entry was placed in the descriptor cache. The tag also contains a valid bit 741 indicating if the entry is valid, and a code segment flag (CS) 742. The CS flag 742 is used to identify the type of descriptor cached, since different protection checks are applied for code segments as opposed to data segments. Data array 730 contains unscrambled segment descriptors, each of which contains access rights 751, base address 752, and limit 753.

Figure 8:
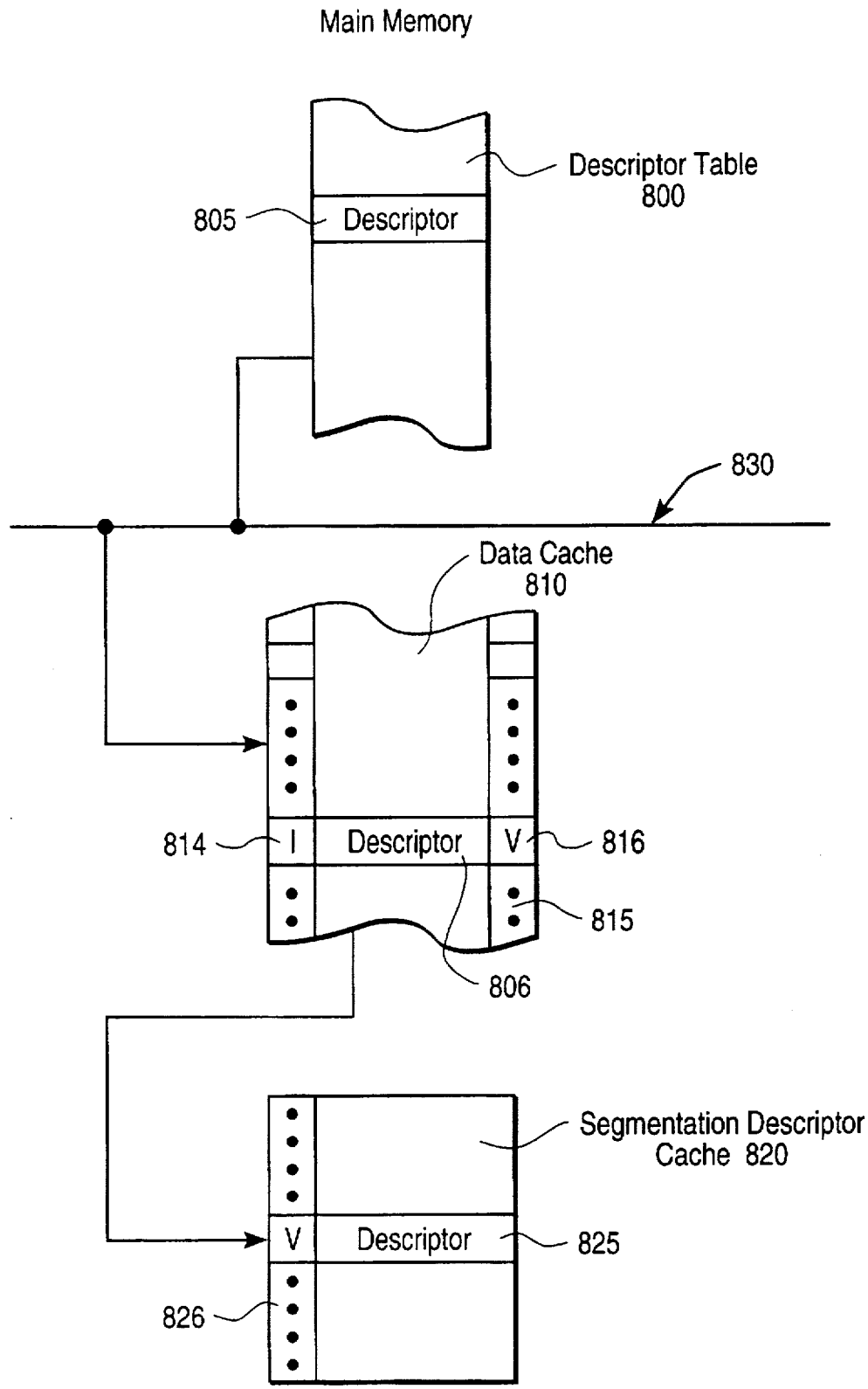
FIG. 8 illustrates the preferred embodiment of the presently claimed memory management system.
Figure 9:
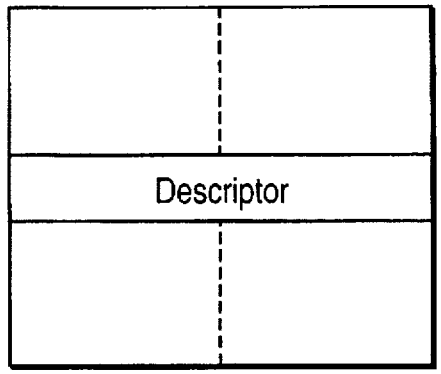
FIG. 9 illustrates the 3 level memory heirarchy currently implemented in the present invention.
Figure 9:
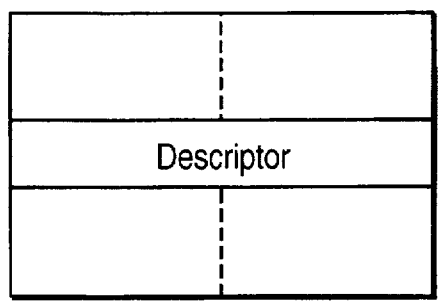
Figure 9:
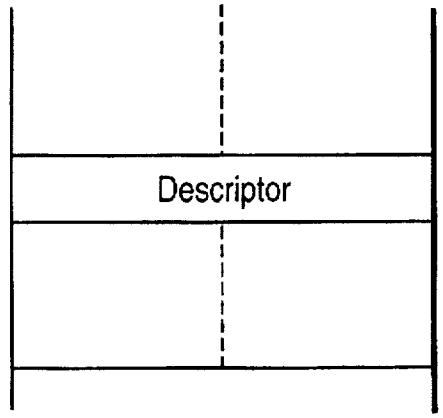

Reference is now made to FIG. 8, where a pictorial representation of the memory management system incorporating the present invention is shown. As shown, segment descriptor cache 820 maintains coherency with data cache 810 by using a data cache inclusion bit mechanism. The data cache 810 maintains coherency with the descriptor table 800 in main memory with a four state coding protocol called "MESI". The "MESI" protocol is used in many current generation microprocessor designs and therefore is not described in this application. Descriptors are stored in descriptor table 800, which typically resides in main memory. Descriptor 805 can be fetched from descriptor table 800 through bus 830 and loaded into data cache 810. When data or descriptors are loaded into the data cache line 806, a valid bit 816 is set indicating the data cache 810 contains valid data in that cache line. When descriptor 806 is cached in descriptor cache 820 in response to a segment selector load, an inclusion bit 814 corresponding to descriptor 806 is set in data cache 810 to indicate that descriptor 806 in data cache 810 is associated with descriptor 825 in descriptor cache 820. Furthermore, the descriptor entry valid bit 826 is set indicating the descriptor cache 820 contains a valid entry. Descriptor 825 is the tested and unscrambled version of descriptor 806, as described in conjunction with the descriptor cache above. Typically, descriptor table 800 can be accessed and modified by other processors (not shown) in the system through bus 830. Thus, whenever descriptor 806 with its inclusion bit 814 set in data cache 810 is modified or swapped out, the entire descriptor cache 820 is flushed to preserve coherency. Also, all inclusion bits in data cache 810 are cleared to indicate the dissociation between data cache 810 and descriptor cache 820 after the flush. A flush in the descriptor cache 820 clears all entries' valid bit 826. It should be understood by those skilled in the art that coherency between descriptor table 800 and data cache 810 is maintained by the cache valid bits 815 such that if a descriptor 805 is modified in descriptor table 800, its counterpart becomes invalid in data cache 810.

Furthermore, with reference made to FIG. 8, a modification or swap out of any data cache line with the inclusion bit set will flush all of the entries in the descriptor cache. Since the flushing mechanism does not pinpoint the exact entry in the descriptor cache which is being disassociated, other entries which could maintain an association are also disassociated. As such, some entries will be flushed when it is not required to, which could have an adverse affect on performance. It should be obvious to those skilled in the art that descriptor cache flushes need to be limited as much as possible. Flushes due to data cache line swap outs can be reduced by biasing the replacement algorithm in the data cache 810. The data cache 810 is two way associative and maintains an LRU bit (not shown) to determine which entry to replace with minimal performance loss. The inclusion bit is used to bias the replacement algorithm as is shown in FIG. 10. It should also be apparent to those skilled in the art that the cache coherency mechanism using inclusion bits is superior to other mechanisms in many ways. It is superior to a mechanism using a pointer in the data cache to indicate which entry is to be flushed, which requires additional addressing bits in the data cache. It is also superior to a mechanism of maintaining addresses in descriptor cache of descriptors in data cache such that the address of a modified descriptor will be compared to those in the descriptor cache. Such a scheme typically requires the descriptor cache to maintain full addresses and to compare each of its addresses whenever an entry in data cache is modified. Other descriptor cache coherency mechanisms typically require more hardware, which would reduce the size of the descriptor cache which could be built.

With reference to FIG. 8, data cache 810 is also shown with valid bits 815 corresponding to descriptors in data cache 810. Valid bit 816 is set whenever descriptor 805 from descriptor table 800 is cached into data cache 810. Valid bit 816 remains set until descriptor 805 in descriptor table 800 is altered such that descriptor 806 in data cache 810 is no longer valid with respect to its association with descriptor 805 in descriptor table 800. Furthermore, when valid bit 816 is reset, descriptor cache 820 is also flushed if descriptor 806 has its inclusion bit 814 set, i.e. descriptor 806 is dissociated with descriptor 825 in descriptor cache 820. With the implementation of valid bits 815 in data cache 810, memory coherency between descriptor cache 820 and descriptor table 800 is maintained because descriptor cache 820 is flushed whenever a descriptor 806 with its inclusion bit 814 set is altered in data cache 810 and/or whenever a descriptor 805 with a corresponding valid bit and inclusion bit set is altered in descriptor table 800.

While the present invention has been described with reference to FIGS. 1 through 8, it will be appreciated that the figures are for illustrative purposes only, and do not limit the spirit and scope of the invention.

What is claimed is:

1. A method of maintaining cache coherency between a data cache and a segment descriptor cache in a memory management system of a computer, said memory management system comprising (i) a descriptor table coupled to a data processing unit for storing segment descriptors in a first format, (ii) a data cache coupled to said data processing unit for storing a plurality of data entries including segment descriptors in said first format, each of said data entries having an inclusion bit, and (iii) a segment descriptor cache coupled to said data cache and data processing unit having a plurality of segment entries for storing segment descriptors in a second format, said method comprising:

(a) providing a segment selector, said segment selector specifying a segment descriptor in a first format in a descriptor table;

(b) retrieving said segment descriptor in said first format from said descriptor table in response to said segment selector;

(c) storing said segment descriptor in said first format into a first entry in the data cache;

(d) formatting said segment descriptor in said first format into the second format;

(e) storing said segment descriptor in said second format into a first segment entry in the segment descriptor cache;

(f) setting the inclusion bit associated with said first entry in said data cache, so that said inclusion bit indicates an association between said first entry in said data cache stored in said step (c) and said first segment entry stored in said step (e) in said segment descriptor cache;

(g) if the segment descriptor stored in the first entry in said data cache is altered by said data processing unit, checking said inclusion bit in said data cache; and (h) flushing said entire segment descriptor cache if said segment descriptor in said first format with a set inclusion bit has been altered.

2. A method according to claim 1, further comprising:

(i) setting a valid bit for said first entry in said data cache;

(j) checking said descriptor table to determine whether said segment descriptor in said first format has been altered such that its counterpart in said data cache is different;

(k) resetting said valid bit if said segment descriptor in said first format in said descriptor table has been altered; and (l) flushing said segment descriptor cache if said segment descriptor in said first format has been altered with its inclusion bit set, whereby said segment descriptor cache is flushed whenever a segment descriptor in said data cache with a set inclusion bit is altered in said descriptor table.

3. The method of claim 1, wherein said step (h) includes marking invalid a plurality of valid bits associated with the segment descriptor cache.

4. A memory system for a computer in which memory includes a plurality of memory segments, comprising:

a descriptor table coupled to a plurality of agents for storing a plurality of descriptors in a first format, each of said plurality of descriptors being specified by a segment selector received from said agents;

a data cache coupled to one of said agents for caching a plurality of descriptors in said first format;

descriptor format means coupled to said data cache for formatting descriptors in said first format into descriptors in a second format such that said descriptors are used by said agent to select their corresponding segments;

a descriptor cache coupled to said data cache for caching said descriptors in said second format, each of said descriptors in said second format being used for selecting one of said segments;

a plurality of inclusion bits coupled to said data cache to identify a descriptor in said first format in said data cache;

inclusion bit setting means coupled to said inclusion bits for setting each of said inclusion bits to indicate that a descriptor in said first format in said data cache is associated with a descriptor in said second format in said descriptor cache;

inclusion bit check means to determine whether any descriptor in said first format with a set inclusion bit in said data cache has been altered;

descriptor cache flush means for flushing said entire descriptor cache if any descriptor in said first format with its inclusion bit set in said data cache has been altered.

5. A memory system according to claim 4, further comprising:

a plurality of valid bits coupled to said data cache for setting a valid bit corresponding to a descriptor in said first format to indicate that said descriptor in said first format is cached in said data cache from a descriptor in said descriptor table;

valid bit check means coupled to said data cache for checking whether a descriptor in said descriptor table corresponding to a descriptor in said first format in said data cache with a valid bit set has been altered, and if so, said valid bit check means causing said inclusion bit check means to determine whether an inclusion bit is set for said descriptor in said data cache;

descriptor cache flush means for flushing said descriptor cache if said descriptor in said first format has its inclusion bit set in said data cache, whereby said descriptor cache is flushed whenever a descriptor with an inclusion bit set has its corresponding entry in said descriptor table altered.

6. The memory system of claim 4 further comprising a plurality of segment valid bits coupled to said segment descriptor cache to indicate the validity of entries in the segment descriptor cache, and wherein said descriptor cache flush means includes means for marking said plurality of segment valid bits invalid.

* * * * *

UNITED STATES PATENT AND TRADEMARK OFFICE
CERTIFICATE OF CORRECTION

PATENT NO.     : 5,895,489                                          Page 1 of 1
DATED          : April 20, 1999
INVENTOR(S)    : Hammond et al.

It is certified that error appears in the above-identified patent and that said Letters Patent is hereby corrected as shown below:

Column 7,
Line 4, delete "a" and insert -- the --.
Line 4, delete "first segment entry in the".
Line 7, delete "an association between said first entry in said data cache stored in said step (c) and said first segment entry stored in said step (e) in said segment descriptor cache;" and insert -- that said segment descriptor in said first format in said data cache is associated with said segment descriptor in said second format in said segment descriptor cache --.

Signed and Sealed this

Twenty-seventh Day of April, 2004

JON W. DUDAS
*Acting Director of the United States Patent and Trademark Office*